US008037698B2

(12) United States Patent
Heckt et al.

(10) Patent No.: US 8,037,698 B2
(45) Date of Patent: Oct. 18, 2011

(54) AIR CONDITIONING UNIT FOR MOTOR VEHICLES AND METHOD FOR ITS OPERATION

(75) Inventors: Roman Heckt, Aachen (DE); Marc Graaf, Krefeld (DE); Tobias Haas, Koeln (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 631 days.

(21) Appl. No.: 12/175,040

(22) Filed: Jul. 17, 2008

(65) Prior Publication Data
US 2009/0019861 A1 Jan. 22, 2009

(30) Foreign Application Priority Data

Jul. 20, 2007 (DE) .................. 10 2007 035 110

(51) Int. Cl.
*F25B 43/00* (2006.01)
(52) U.S. Cl. .......................... 62/114; 62/513
(58) Field of Classification Search ............ 62/3.2, 62/401, 114, 512, 513, 244, 406, 434
See application file for complete search history.

(56) References Cited

U.S. PATENT DOCUMENTS

| | | | | |
|---|---|---|---|---|
| 5,046,325 A * | 9/1991 | Kuwahara | .................. | 62/156 |
| 5,406,805 A * | 4/1995 | Radermacher et al. | .......... | 62/81 |
| 5,622,055 A * | 4/1997 | Mei et al. | ..................... | 62/113 |
| 5,899,473 A * | 5/1999 | Fraser et al. | ................... | 62/473 |
| 5,921,092 A * | 7/1999 | Behr et al. | ..................... | 62/81 |
| 6,185,957 B1 * | 2/2001 | Voss et al. | ..................... | 62/513 |
| 6,233,969 B1 * | 5/2001 | Yamauchi et al. | .............. | 62/513 |
| 6,260,367 B1 * | 7/2001 | Furuya et al. | .................. | 62/197 |
| 6,386,277 B1 * | 5/2002 | Wattelet et al. | ................ | 165/164 |
| 6,467,300 B1 * | 10/2002 | Noble, III | ........................ | 62/472 |
| 6,523,360 B2 * | 2/2003 | Watanabe et al. | .............. | 62/204 |
| 6,606,867 B1 * | 8/2003 | Sienel | ............................. | 62/113 |
| 6,662,576 B1 * | 12/2003 | Bai | ................................. | 62/117 |
| 6,701,723 B1 * | 3/2004 | Dobmeier et al. | ............... | 62/90 |
| 6,786,057 B2 * | 9/2004 | Ben Yahia | ....................... | 62/222 |
| 6,901,763 B2 * | 6/2005 | Memory et al. | ................. | 62/113 |
| 6,923,011 B2 * | 8/2005 | Manole | ........................... | 62/149 |
| 6,923,019 B2 * | 8/2005 | Kawakubo et al. | ............. | 62/506 |
| 7,076,964 B2 * | 7/2006 | Sakakibara | ................... | 62/238.6 |
| 7,131,291 B2 * | 11/2006 | Aflekt et al. | ..................... | 62/498 |
| 7,240,494 B2 * | 7/2007 | Akei et al. | ....................... | 62/3.2 |
| 7,334,430 B2 * | 2/2008 | Kakehashi et al. | ............. | 62/513 |

(Continued)

FOREIGN PATENT DOCUMENTS

DE 100 60 114 A1 6/2001
(Continued)

*Primary Examiner* — Mohammad Ali
(74) *Attorney, Agent, or Firm* — Fraser Clemens Martin & Miller LLC; J. Douglas Miller

(57) ABSTRACT

An air conditioning unit is disclosed for motor vehicles. The air conditioning unit includes with a compression refrigerant circuit where a refrigerant circulates, comprising comprehensively switched in series with respect to fluid flow at least one compressor upstream of a heat-delivering heat exchanger, and an expansion element upstream of a heat-absorbing heat exchanger, whereby into the flow path leading from the outlet of the heat-delivering heat exchanger to the expansion element an additional heat exchanger is integrated thermally coupled to at least one cooling means the temperature of which can be put to values below the temperature of the refrigerant in the compression refrigeration circuit at the position of the refrigerant's outflow from the heat-delivering heat exchanger, and a method for its operation.

18 Claims, 8 Drawing Sheets

U.S. PATENT DOCUMENTS

| | | | |
|---|---|---|---|
| 2001/0017037 A1* | 8/2001 | Martin | 62/216 |
| 2005/0028545 A1* | 2/2005 | Hebert | 62/274 |
| 2006/0137366 A1* | 6/2006 | Kang et al. | 62/149 |
| 2007/0074536 A1* | 4/2007 | Bai | 62/513 |
| 2007/0101737 A1* | 5/2007 | Akei et al. | 62/238.6 |

FOREIGN PATENT DOCUMENTS

| | | |
|---|---|---|
| DE | 102 31 645 A1 | 1/2003 |
| DE | 101 59 148 A1 | 6/2003 |
| DE | 102 58 618 B3 | 6/2004 |
| WO | WO 2005/059449 A1 | 6/2005 |

* cited by examiner

AIR CONDITIONING UNIT FOR MOTOR VEHICLES AND METHOD FOR ITS OPERATION

CROSS-REFERENCE TO RELATED APPLICATION

This application claims the benefit of German patent application serial no. DE 102007035110.2-16 filed Jul. 20, 2007, hereby incorporated herein by reference in its entirety.

FIELD OF THE INVENTION

The present invention relates to an air conditioning unit for motor vehicles, and more specifically to a compression refrigerant circuit of an air conditioning unit for motor vehicles.

BACKGROUND OF THE INVENTION

Air conditioning units for motor vehicles typically include a compressor, a heat exchanger delivering heat, i. e. a condenser, or gas cooler, respectively, an expansion element, and one or several heat exchangers absorbing heat, for example evaporators. The heat-delivering heat exchanger functions to cool the refrigerant after having been compressed and heated as close as possible to the ambient temperature level. The heat-delivering heat exchanger is typically positioned in the engine compartment between the head lamps exposed to the air stream. When the air stream is insufficient, functioning of the heat-delivering heat exchanger is additionally supported by one or several fans.

Traditional air conditioning units are usually passed by a refrigerant that frequently has a composition including fluorine. Such units are, as a rule, operated in the sub-critical mode. That means that the diphase region of the refrigerant is passed when the refrigerant is evaporated at the low temperature level, as well as when the refrigerant is condensed at the high temperature level. Further, air conditioning units are known that function based on natural refrigerants, such as carbon dioxide. A refrigeration circuit with carbon dioxide as refrigerant functions, as a rule, in the supercritical mode. This means that in the refrigerant condition obtained by the compression, both the temperature and the pressure of the compressed carbon dioxide are higher than the critical pressure and critical temperature of carbon dioxide. Therefore, during subsequent delivery of heat by the refrigerant in the gas cooler, the wet vapor region is not passed.

It is decisive for the refrigerating capacity of a motor vehicle air conditioning unit, particularly in compression refrigeration circuits operated above supercritically, to achieve a refrigerant temperature as low as possible before the refrigerant is fed to the expansion element. To this end, circuit designers usually attempt to approximate the refrigerant temperature in the heat-delivering heat exchanger as close as possible to the ambient temperature.

In many vehicles, it is difficult to make such an approximation to the ambient temperature, particularly during a halt of the vehicle or under unfavorable ambient conditions. On the cooling airside, for example, due to heated pavement surface or backflow from the engine compartment, the input temperature of the cooling air may be significantly higher than the ambient temperature. This undesired preheating of the cooling air may often even be by 20 to 25 degrees centigrade. Also oil coolers and charge-air coolers positioned upstream contribute to this effect. Even if the temperature of the refrigerant was lowered to the temperature of this relatively hot cooling air, which is virtually impossible by mere heat transfer, the resulting cooling effect, hence the refrigeration capacity, would be insufficient in many cases. As a consequence, depending on the circuit design, the optimal high pressure or the necessary refrigeration capacity, respectively, can no longer be realized. A decrease in the COP and an increase in the power demand of the compressor drive result. In particular, at high ambient temperatures, where a high refrigeration capacity is normally required, these effects are markedly negative, not compatible with the comfort demands as having become usual in the meantime.

It is known to increase the capacity of an air conditioning unit for motor vehicles by passing the refrigerant through branched flow paths, for example, using an internal heat exchanger with separated flows upstream of an evaporator. Documents WO 2005/059449A1 and DE 10060114A1 are illustrative of such a design. However, such a design places relatively high installation demands for the realization of the various flow paths and the great number of line connections.

Further, it is known to cool the refrigerant before it is fed to a condenser/gas cooler. This, for example, can be obtained in that between the compressor and the throttling device of an air conditioning unit an additional heat exchanger is provided that extracts heat from the compressed refrigerant before the refrigerant reaches the condenser/gas cooler. Document DE 10231645A1 is illustrative of such a design. In this way, the inlet temperature on the hot side of the condenser/gas cooler is reduced. However, the problem of a too high ambient temperature as the lowest theoretically achievable refrigerant temperature at the outlet of the heat-delivering heat exchanger remains unsolved with this solution.

It is further known to reduce the temperature of the refrigerant before the inlet into an evaporator by that before the evaporator a heat exchanger is installed where heat is extracted from the refrigerant in countercurrent mode by evaporating liquid water. For this, the water to be evaporated is supplied from the collected condensate of the air conditioning unit and fed to the heat exchanger. Document DE 10159148A1 is illustrative of such a design. This solution is disadvantageous in that the formation of condensate and the efficiency of the evaporation strongly depend on the ambient conditions, particularly the humidity of the air. Hence the supporting function of such an assembly can only be controlled within narrow limits. Furthermore, functioning of this additional cooling depends on the operational state of the air conditioning circuit. At least a certain operational time in advance is necessary until a sufficient condensate flow will have started to supply the additional heat exchanger with condensate.

It is also known to include in the refrigerant circuit a cold store switched in series that, especially when the refrigerating capacity of the evaporator is not sufficient or not available, provides a cooling potential. Document DE 10258618B3 is illustrative of such a design. Such systems are preferably used for the air conditioning of motor vehicles at rest, serving to cool the passenger cell before the compression circuit of the real air conditioning unit has developed its full effect.

It would be desirable to produce an air conditioning unit for a vehicle that provides sufficient refrigerating capacity at a maximized efficiency under critical conditions such as at high ambient temperatures and periods when the vehicle is stationary.

SUMMARY OF THE INVENTION

Compatible and attuned with the present invention, an air conditioning unit for a vehicle that provides sufficient refrigerating capacity at a maximized efficiency under critical conditions such as high ambient temperatures and periods when the vehicle is stationary, has surprisingly been discovered.

An aspect of the invention is based on supporting the heat delivery function of the compression refrigeration circuit in air conditioning units for motor vehicles. The support is realized in that an additional heat sink is inserted in the compression refrigeration circuit. The heat sink is added to the compression refrigeration circuit downstream of the heat delivering heat exchanger. The thermal properties of the heat sink are switchable and/or controllable. The function of the heat sink, namely, removing heat from the refrigerant of the compression refrigeration circuit, is realized primarily decoupled from the operational state of the compression refrigeration circuit. In the whole, the invention enables effective, defined cooling of the refrigerant in the compression refrigeration circuit of an air conditioning unit for motor vehicles to be realized according to the demand. Thus, the invention comprises an air conditioning unit for motor vehicles with a compression refrigeration circuit where a refrigerant circulates, at least one compressor comprehensively switched in series with respect to fluid flow upstream of a heat-delivering heat exchanger, and an expansion element upstream of a heat-absorbing heat exchanger, whereby an additional heat exchanger is integrated into the flow path leading from the outlet of the heat-delivering heat exchanger to the expansion element, the additional heat exchanger thermally coupled to at least one cooling means, the temperature of which can be put to values below the temperature of the refrigerant in the compression refrigeration circuit at the position of the refrigerant's outflow from the heat-delivering heat exchanger. The invention can be advantageously used if, further, an internal heat exchanger is included that, on the one hand, is integrated into the flow path leading from the heat-absorbing heat exchanger to the compressor and, on the other hand, is integrated into the flow path leading from the heat-delivering heat exchanger to the expansion element, and is switched with respect to fluid flow in series with the additional heat exchanger acting as heat sink according to the invention.

The invention is advantageously based on an air conditioning unit for motor vehicles with a compression refrigeration circuit where a refrigerant circulates, at least one compressor, comprehensively switched in series with respect to fluid flow, upstream of a heat-delivering heat exchanger, and an expansion element upstream of a heat-absorbing heat exchanger, whereby furthermore, especially in supercritically operated compression refrigeration circuits, an internal heat exchanger is included that, on the one hand, is integrated into the flow path leading from the heat-absorbing heat exchanger to the compressor and, on the other hand, is integrated into the flow path leading from the heat-delivering heat exchanger to the expansion element, whereby an additional heat exchanger is integrated into the flow path leading from the outlet of the heat-delivering heat exchanger to the internal heat exchanger, the additional heat exchanger thermally coupled to at least one cooling means, the temperature of which can be put to values below the temperature of the refrigerant in the compression refrigeration circuit at the position of the refrigerant's outflow from the heat-delivering heat exchanger. The invention can also be used in air conditioning units where the refrigerant in the compression refrigeration circuit comprises compressed carbon dioxide. Cooling means in terms of the invention are technical mediums and devices, the temperature of which can be specifically decreased, or that are required, respectively, for decreasing the temperature. They are not limited to refrigerants and/or cooling fluids, but include them.

For operating an air conditioning unit according to the invention, processes for the operation of air conditioning units for motor vehicles are suitable including the above mentioned components of a compression refrigeration circuit where a refrigerant circulates, if at least one parameter that depends on the temperature of the refrigerant at the position of the refrigerant's output from a heat exchanger that delivers heat to the ambience is measured or manually judged, and dependent on the value of this parameter the temperature of at least one cooling means, which is thermally coupled to the compression refrigeration circuit over an additional heat exchanger, which is positioned with respect to fluid flow downstream of the heat exchanger that delivers heat to the ambience and upstream of an expansion element, preferably an internal heat exchanger, is decreased. For that to realize, the temperature of the refrigerant itself or the surface temperature of the refrigerant-leading line can be measured as a parameter that depends on the temperature of the refrigerant at the position of its outflow from the heat exchanger that delivers heat to the ambience. The manual judgment of such a parameter can be the mere establishment that the temperature subjectively felt in the driver cab is too high.

Automated operation of an air conditioning unit according to the invention can, for example, be obtained by that the temperature of the refrigerant is automatically reduced when the value of the measured parameter exceeds a threshold value. It is particularly advantageous if hereby the temperature of the refrigerant is reduced in a controlled manner, whereby the measured parameter is used as control variable. That means that the additional heat sink is not simply activated, but the energy required for the activation of the heat sink is continuously utilized according to the demand, not being wasted by a too high cooling output.

The realization of the refrigeration output can be ensured under critical conditions for the heat-delivering heat exchanger which is part of a compression refrigeration circuit of a motor vehicle air conditioning unit. The increase in customer's comfort is obvious. The increase in the capacity of the compression refrigeration circuit is automatically in an easy manner, or manually switchable.

Ecological and economical advantages follow because the components of the compression refrigeration circuit of air conditioning units according to the invention can be dimensioned closer to the rating due to the switchable power reserves and less energy is needed to operate the air conditioning unit under optimal and normal ambient conditions.

Expensive measures to thermally optimize vehicle front sections can be significantly reduced, or completely cancelled. Different variant types of a vehicle can be easily realizable, because in the area of the primary compression refrigeration circuit, no individual optimization actions are necessary. The solution of the invention is usable in different vehicle versions, also of different manufacturers, with relatively little effort. Also, retrofitting is possible, and due to the consistent, with respect to fluid flow, separation of the primary compression refrigeration circuit of the air conditioning unit from supporting units serving to lower the temperature at the additional heat exchanger, retrofitting can be carried out at little installation effort. Only the additional heat exchanger has to be integrated into the existing original compression refrigeration circuit. This is very advantageous for opening the retrofitting market.

Also, for the above mentioned reasons, it is advantageous for air conditioning units according to the invention to integrate an additional heat exchanger thermally coupled to at least one cooling means, the temperatures of which can be lowered to values below the ambient temperature into the flow path leading from the outlet of the heat-delivering heat exchanger to the internal heat exchanger. It is particularly advantageous if the temperature of the cooling means can be adjusted dependent on the temperature of the refrigerant in the compression refrigeration circuit.

An especially simple embodiment of the invention results, if the cooling means comprises a secondary circuit including a circulating fluid and an additional heat-delivering heat exchanger. Only the cooling output of the heat-delivering heat exchanger is coupled into the primary compression refrigeration circuit, which can already be useful at extreme operational conditions.

Alternatively or additionally, an advantage arises if the cooling means includes at least one thermoelectric element.

Alternatively or additionally, an advantage arises if over the additional heat exchanger the primary compression refrigeration circuit of the air conditioning unit can be thermally coupled to the cold part of a heat pump circuit.

Another advantageous embodiment of the air conditioning unit according to the invention follows, if a cold store is included that can be charged using a charging heat exchanger positioned in the primary compression refrigeration circuit downstream of the heat-absorbing heat exchanger. At operational conditions that do not require reducing the temperature of the cooling means, the cold store is then charged using the charging heat exchanger that is thermally coupled to the compression refrigeration circuit. At operational conditions that do require reducing the temperature of the cooling means, the cold store is then thermally coupled to the compression refrigeration circuit via the additional heat exchanger. In this way, at these operational conditions, the additional heat sink according to the invention is provided. Thermal coupling of the cold store to the compression refrigeration circuit over the additional heat exchanger is advantageously carried out over a secondary refrigeration circuit, which in this case arranges the thermal contact between the cold store and the primary compression circuit of the air conditioning unit over a circulating fluid.

The above mentioned variants of embodiments of the cooling means in terms of the invention can be combined with each other or exchanged for each other, if required, or admitted, respectively, by the technical and/or economical conditions.

BRIEF DESCRIPTION OF THE DRAWINGS

The above as well as other objects and advantages of the invention, will become readily apparent to those skilled in the art from reading the following detailed description of a preferred embodiment of the invention when considered in the light of the accompanying drawing which.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
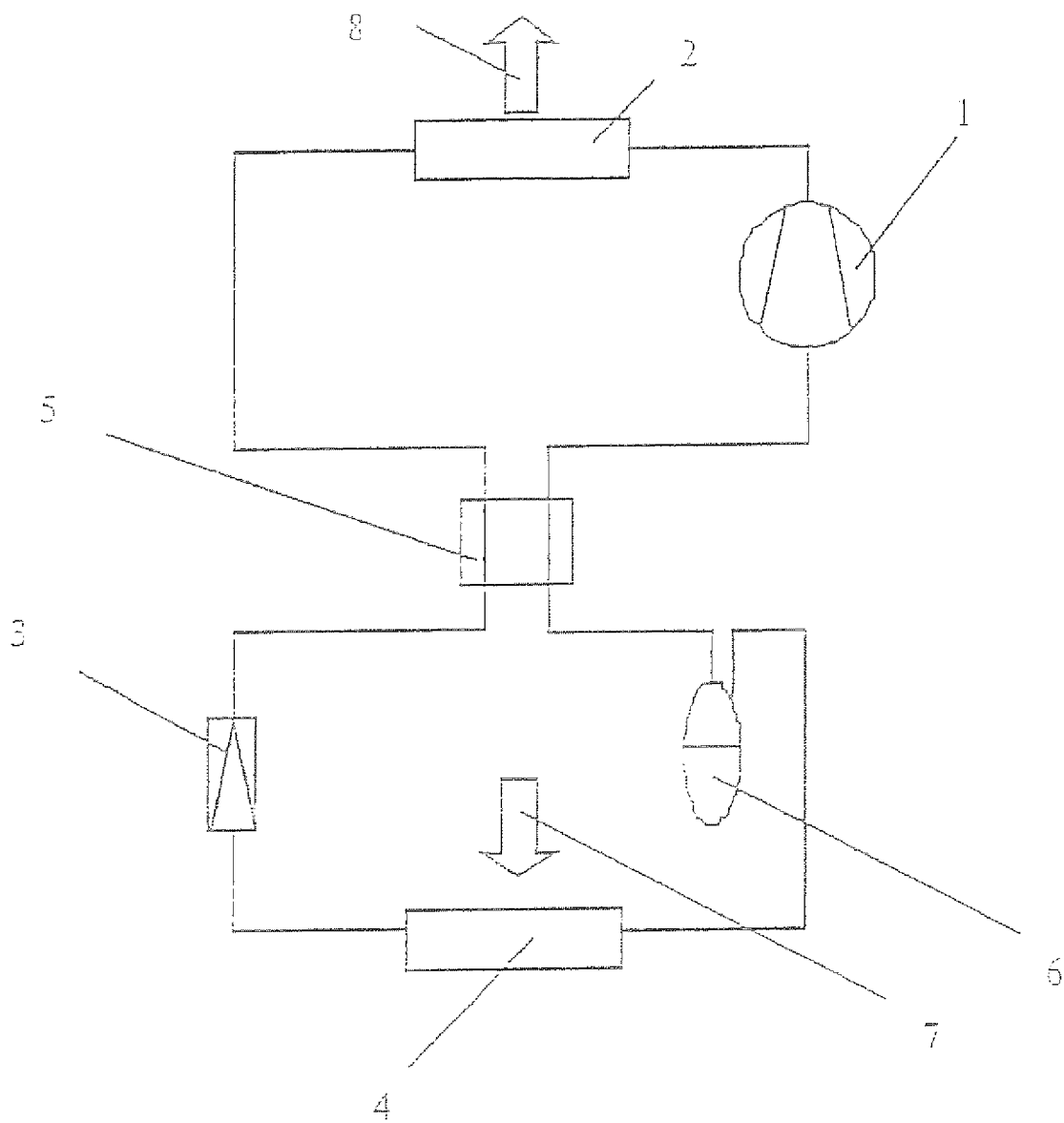
FIG. 1 is a schematic illustration of a refrigeration circuit of an air conditioning unit for vehicles according to the prior art.

FIG. 1 shows a conventional compression refrigeration circuit of an air conditioning unit for motor vehicles. This circuit includes a compressor 1, a heat-delivering heat exchanger 2, i. e. a heat exchanger in form of a condenser, or gas cooler, respectively, an expansion element 3, and a heat-absorbing heat exchanger 4, for example in form of an evaporator. During operation of the air conditioning unit, a refrigerant circulates in the compression refrigeration circuit, the refrigerant continuously changing its temperature and/or pressure with phase transitions being possible. The heat-absorbing heat exchanger 4 is passed by the refrigerant at lower pressure while absorbing heat from the air surrounding it that is to be cooled. The absorbed heat leads to evaporation and/or heating of the refrigerant. The gaseous refrigerant is then passed through the compressor 1, whereby the pressure and temperature of the refrigerant increase. The compressed hot refrigerant is directed to the heat-delivering heat exchanger 2, where a portion of the heat energy is released to the ambient air so that the enthalpy of the compressed refrigerant reduces. The compressed refrigerant is then directed to the expansion element 3 and expanded so that its pressure and temperature decrease. At this state the expanded cold refrigerant is again led into the heat-absorbing heat exchanger 4. In order to enhance the efficiency of such air conditioning units, an internal heat exchanger 5 is integrated, preferably passed counter currently. For an air conditioning unit configured like that to work efficiently, it is required that the refrigerant is led into the heat-absorbing heat exchanger 4 with an enthalpy as low as possible. Under unfavorable environmental or operational conditions, the heat delivered by the heat-delivering heat exchanger 2 is not sufficient to ensure at certain operational pressures a sufficiently low refrigerant enthalpy at the outlet of the expansion element 3. Further, for the sake of completeness, an accumulator 6 is shown. The accumulator 6 can also be combined with the internal heat exchanger 5 to form one component. Air is directed to both heat exchangers 2, 4, which is symbolized by arrows. One arrow marks an air flow 7 that is to be cooled. The other arrow marks an ambient air flow 8 that is to remove heat from the heat-delivering heat exchanger 2, causing cooling or condensation of the refrigerant.

Figure 2:
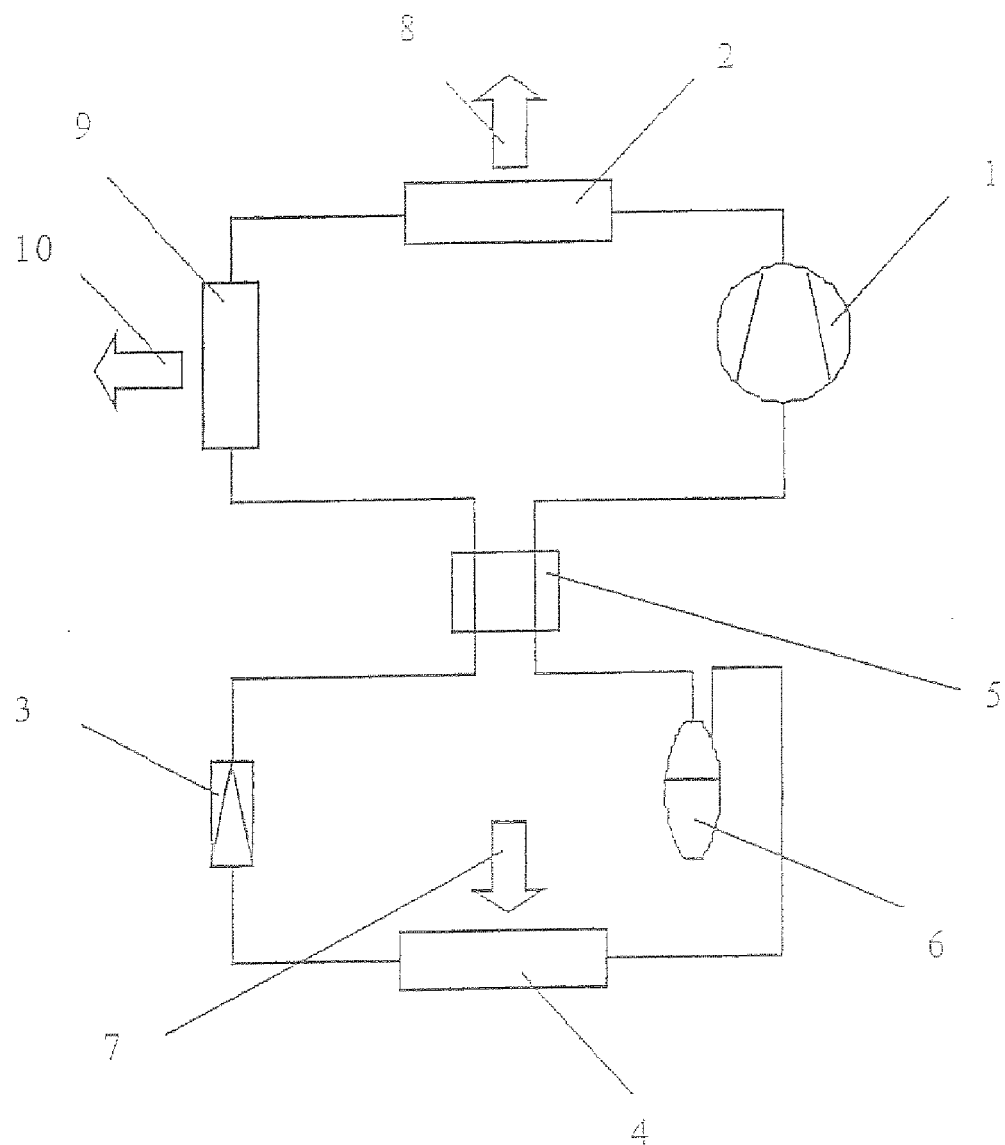
FIG. 2 is a schematic illustration of a compression refrigeration circuit of an air conditioning unit for motor vehicles according to the invention, including an additional heat exchanger switched in series downstream of a heat-delivering heat exchanger upstream of an expansion element.

FIG. 2 shows a compression refrigeration circuit of an air conditioning unit for motor vehicles provided with an additional heat exchanger 9 switched in series downstream of a heat-delivering heat exchanger 2, upstream of an expansion element 3. The additional heat exchanger 9 is thermally coupled to a switchable heat sink, the action as heat sink elucidated by the heat flow 10 directed away from the compression refrigeration circuit of the air conditioning unit.

In FIG. 2, the basic strategy of the solution according to the invention is outlined. The goal is to extract more heat when it is required, that is, when the cooling output of the heat-delivering heat exchanger 2 is too low. This function is taken over by the additional heat exchanger 9, when required. It is carried out, according to the invention, directly downstream of the heat-delivering heat exchanger 2, before the refrigerant enters the internal heat exchanger 5. The demand for an additional reduction of the temperature of the refrigerant can be found out, for example, by measuring the temperature of the refrigerant after its exit from the heat-delivering heat exchanger 2 and possibly, by judgment of the temperature difference between the temperature of the refrigerant and the ambient temperature. Then, the controller can decide on putting the additional heat exchanger 9 into action. In this case, the heat sink on the secondary side of the additional heat exchanger 9 has to be activated.

According to the invention, the heat sink on the secondary side of the additional heat exchanger 9 can be established in different ways.

Figure 3:
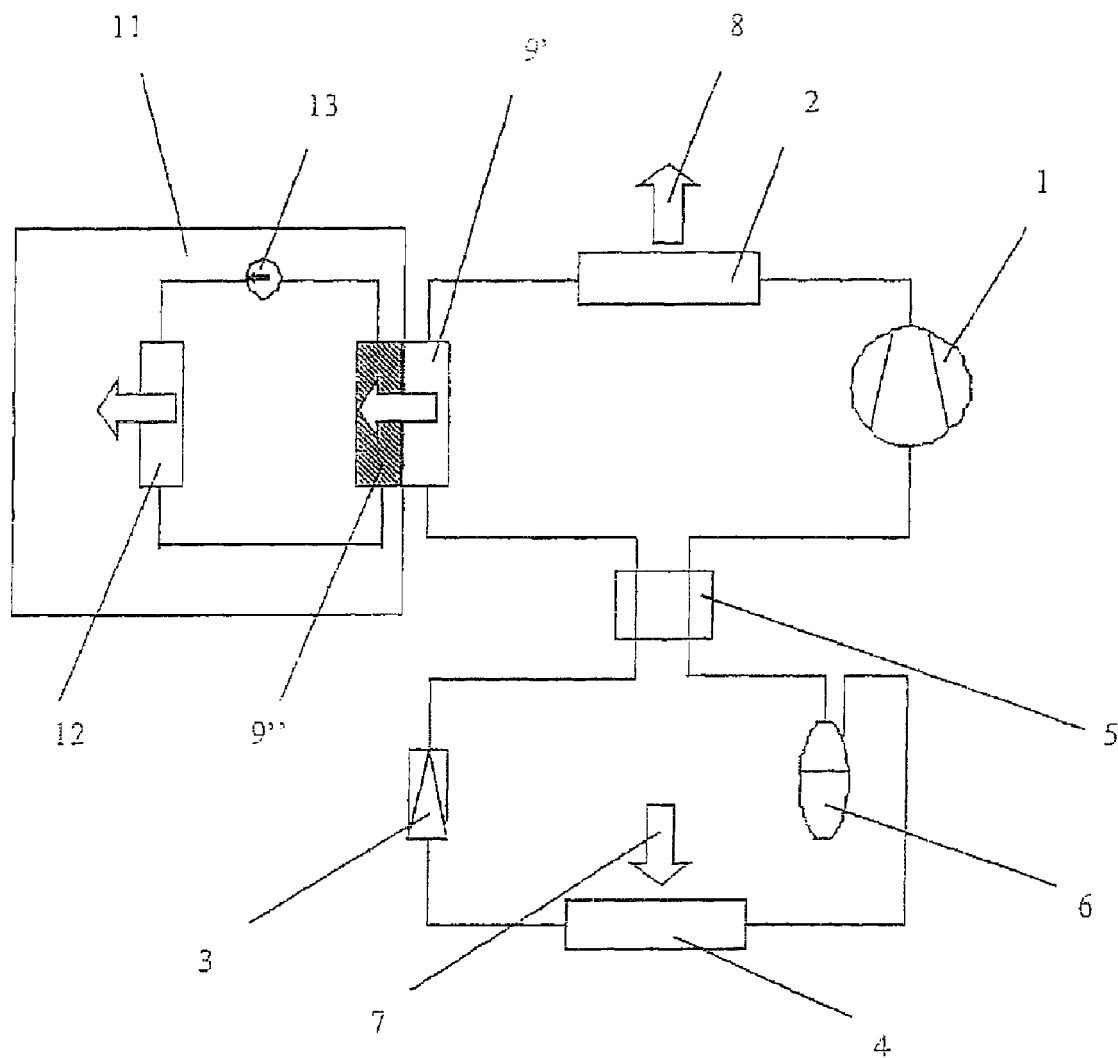
FIG. 3 is a schematic illustration of a compression refrigeration circuit of an air conditioning unit for motor vehicles according to the invention including an additional heat exchanger coupled to a secondary cooling circuit.

FIG. 3 shows a compression refrigeration circuit of an air conditioning unit according to the invention for motor vehicles provided with an additional heat exchanger 9', 9" and coupled to a secondary cooling circuit 11 In this simple embodiment of the invention, the additional heat exchanger 9', 9" on its primary side 9' absorbs heat from the refrigerant and delivers the heat on its secondary side 9" to the secondary circuit 11. The secondary circuit 11 is capable to deliver the absorbed heat to the ambience through another heat exchanger 12, the position of which can be freely chosen. The functional principle of this embodiment is first of all based on that two heat-delivering heat exchangers 2, 12 are provided, the positions of which ensure that the efficiency of the heat delivery to the surrounding air depends in varying manner on the actual boundary conditions. If the airstream is sufficient, thermally almost unadulterated ambient air approaches the heat-delivering heat exchanger 2 in the compression refrigeration circuit, which results in an effective heat transfer. If the airstream diminishes, which can occur on slowing-down or at a halt of the vehicle, the temperature of the inflowing air due to proximity to hot assemblies in the engine compartment or the pavement which is possibly heated up, is no longer equal to the outside temperature, but is partly significantly higher. This problem will not occur at the heat-delivering heat exchanger 12 of the secondary cooling circuit 11, if the position of the heat exchanger 12 ensures a sufficient distance to heated-up assemblies and/or the possibly heated up pavement and/or regions heated up by possible stagnation of flow. In this case, more favorable boundary conditions for heat release exist at the heat-delivering heat exchanger 12 of the secondary cooling circuit 11. According to the invention, coupling in of a heat-delivering heat exchanger 12 can be carried out when the recirculation of a cooling fluid in the secondary cooling circuit 11 is started by a switchable recirculation device 13 such as a recirculation pump, which corresponds to the activation of the heat sink at the additional heat exchanger 9, due to the switchability according to the invention of the heat sink making the energy demand for operating the secondary cooling circuit 11 arise only if required.

By this embodiment of the invention, ambient temperature of the refrigerant can be reached as the minimum. During real operation, however, it will not be possible to cool the refrigerant down so far as to have ambient temperature, as only finite component dimensions can be realized and driving temperature differences are necessary for heat transfer.

Figure 4:
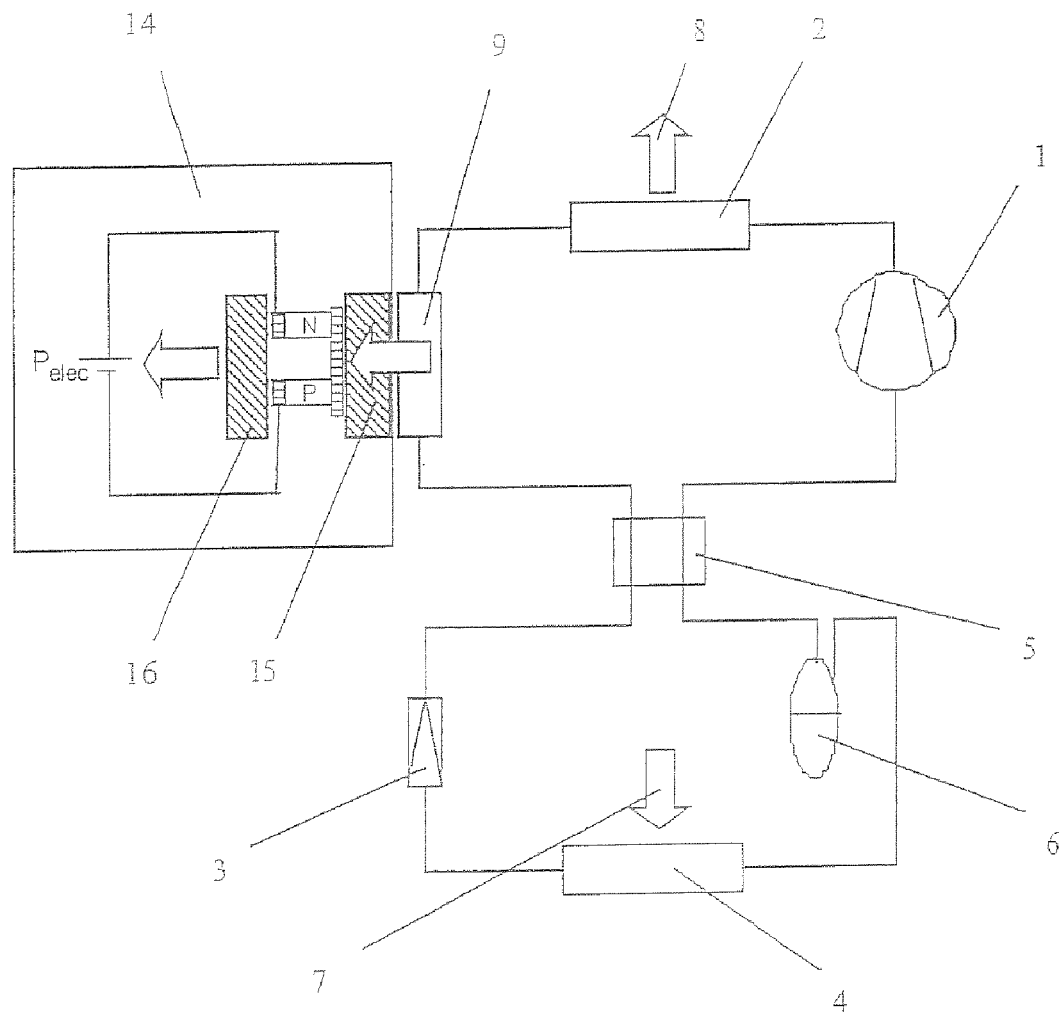
FIG. 4 is a schematic illustration of a compression refrigeration circuit of an air conditioning unit for motor vehicles according to the invention including an additional heat exchanger in contact with a thermoelectric cooling element.

FIG. 4 represents a compression refrigeration circuit of an air conditioning unit according to the invention for motor vehicles provided with an additional heat exchanger 9 in contact to a thermoelectric element 14 used as cooling element In this way, an embodiment is created capable to cool the refrigerant even below the ambient temperature.

The work of thermoelectric elements is based on the Seebeck effect. If a voltage is applied to thermoelectric elements, regions of different temperatures develop. This physical effect enables to directly generate cold from an electric current. The element works like an electrically driven unit that generates cold. It absorbs heat at a certain temperature and releases this heat to the ambience at a higher temperature level. According to the invention, the additional heat exchanger 9 is put into contact to a cold region 15 of the thermoelectric element 14. The hot region 16 of the thermoelectric element 14 is positioned such that it can deliver heat to the ambient air. Therefore, the hot region 16 of the thermoelectric element 14 takes on a temperature near to the temperature of the ambience. If a voltage is applied, the temperature of the cold region 15 of the thermoelectric element 14 is accordingly decreased. Thus, the cold region 15 of the thermoelectric element 14 creates a heat sink usable according to the invention for further cooling down the refrigerant in the compression refrigeration circuit after leaving the heat-delivering heat exchanger 2. Similarly, the embodiment of the invention can be established with several thermoelectric elements provided. Also, thermoelectric elements enable to cool the refrigerant down to temperatures below the ambient temperature. The operation of thermoelectric elements, however, requires electric energy, which is made available by the on-board power supply of motor vehicles. At the same time, the switchability of electric energy also allows the heat sink to be established according to the invention switchable on as required in the compression refrigeration circuit of the air conditioning unit. This embodiment especially offers the advantage of easy retrofitting. Thermoelectric elements, for example, can easily be retrofitted in that they are attached to a refrigerant-containing piece of tube or a similar heat conducting component, intensifying heat dissipation to the ambience when accordingly controlled. Such retrofitting is, for example, advantageous where some vehicles are to be adapted to critical ambient conditions without being compelled to change the series production of the model involved. Of course, the advantage of easy retrofitting even of complete model series or mass-produced vehicles is preserved.

Figure 5:
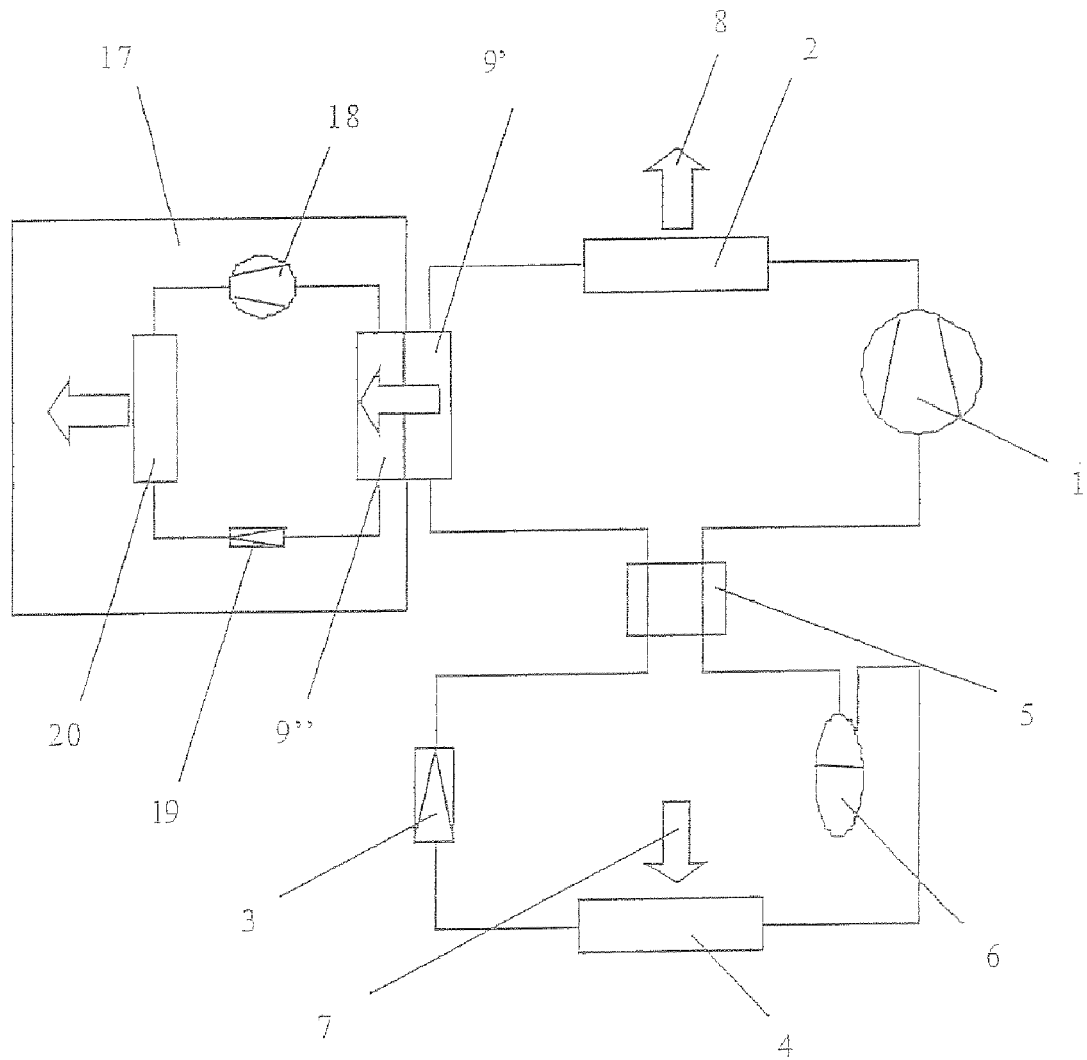
FIG. 5 is a schematic illustration of a compression refrigeration circuit of an air conditioning unit for motor vehicles according to the invention including an additional heat exchanger coupled to another compression circuit.

FIG. 5 shows a compression refrigeration circuit of an air conditioning unit according to the invention for motor vehicles provided with an additional heat exchanger 9', 9", coupled to a further compression refrigeration circuit 17. This embodiment also enables to decrease the temperature of the refrigerant in the primary compression refrigeration circuit of the air conditioning unit after the exit of the refrigerant from the heat-delivering heat exchanger 2 to temperatures below ambient temperature. The further compression refrigeration circuit 17 is an additional circuit that, however, is totally decoupled with respect to fluid flow from the primary compression refrigeration circuit of the air conditioning unit.

Important constituents of the further compression refrigeration circuit 17 are, in addition to the secondary side 9'' of the heat exchanger over which coupling to the primary compression refrigeration circuit of the air conditioning unit is established, a compressor 18, an expansion element 19, and a further heat-delivering heat exchanger 20, over which heat energy is dissipated to the ambience. In an embodiment, the compressor 8 is electrically driven. At the same time, the switchability of the compressor 18 also allows to establish, according to the invention, the additional heat sink to be switchable as required in the compression refrigeration circuit of the air conditioning unit.

Figure 6:
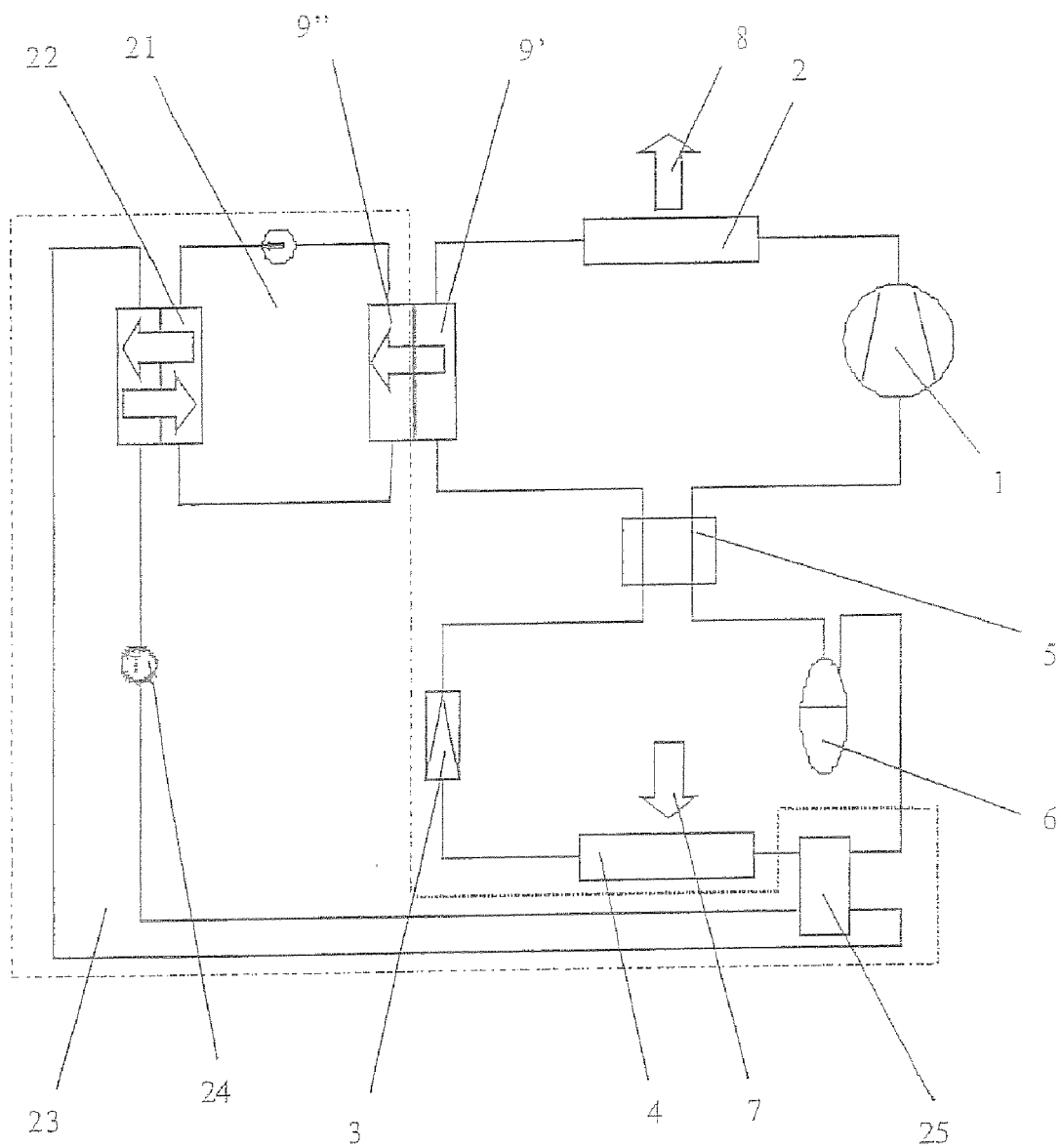
FIG. 6 is a schematic illustration of a compression refrigeration circuit of an air conditioning unit for motor vehicles according to the invention including an additional heat exchanger coupled to a secondary cooling circuit with a cold store.

FIG. 6 shows a compression refrigeration circuit of an air conditioning unit according to the invention for motor vehicles provided with an additional heat exchanger 9', 9'', coupled to a secondary cooling circuit 21 that again is thermally coupled to a cold store 23 over a further heat exchanger 22. The cold store is preferably designed as large-volume fluid circuit with at least one recirculation element 24 established as a pump, for example. At the same time, in the embodiment of an air conditioning unit according to the invention, the cold store 23 is directly thermally coupled to the primary compression refrigeration circuit of the air conditioning unit over a charging heat exchanger 25, which is positioned in the primary compression refrigeration circuit, with respect to fluid flow, downstream of the heat-absorbing heat exchanger 4. At operational conditions that do not require the temperature of the cooling means to be decreased, the cold store 23 is then charged over the charging heat exchanger 25 that is thermally coupled to the compression refrigeration circuit. At operational conditions that do require the temperature of the cooling means to be decreased, the cold store 23 is then thermally coupled to the compression refrigeration circuit over the additional heat exchanger 9', 9''. In this way, at these operational states, the additional heat sink according to the invention is provided. The thermal coupling of the cold store 23 over the additional heat exchanger 9', 9'' to the compression refrigeration circuit is preferably established over the secondary cooling circuit 21, which in this case arranges the thermal contact between the cold store 23 and the primary compression circuit of the air conditioning unit over a recirculating fluid.

In this embodiment, a cold store 23 is charged in those phases where the compression refrigeration process in the compression refrigeration circuit can be run optimally also without using the additional heat sink according to the invention and the conditions of heat delivery by the heat-delivering heat exchanger 2 are nearly optimal, or at least convenient. Downstream of the heat-absorbing heat exchanger 4 the refrigerant hereby passes a further heat exchanger, the charging heat exchanger 25. If the heat-absorbing heat exchanger 4 is an evaporator, the refrigerant is simply continued to be evaporated in the charging heat exchanger 25, thereby extracting a corresponding amount of heat from the working medium on the secondary side of the charging heat exchanger 25, i. e. the fluid in the cold store 23. The so cooled working medium in the cold store 23 is therefore capable to absorb if required a similar amount of heat from the secondary cooling circuit 21, forming the base of a "charged" cold store. The process described here is typically operated in cyclic manner.

Figure 7:
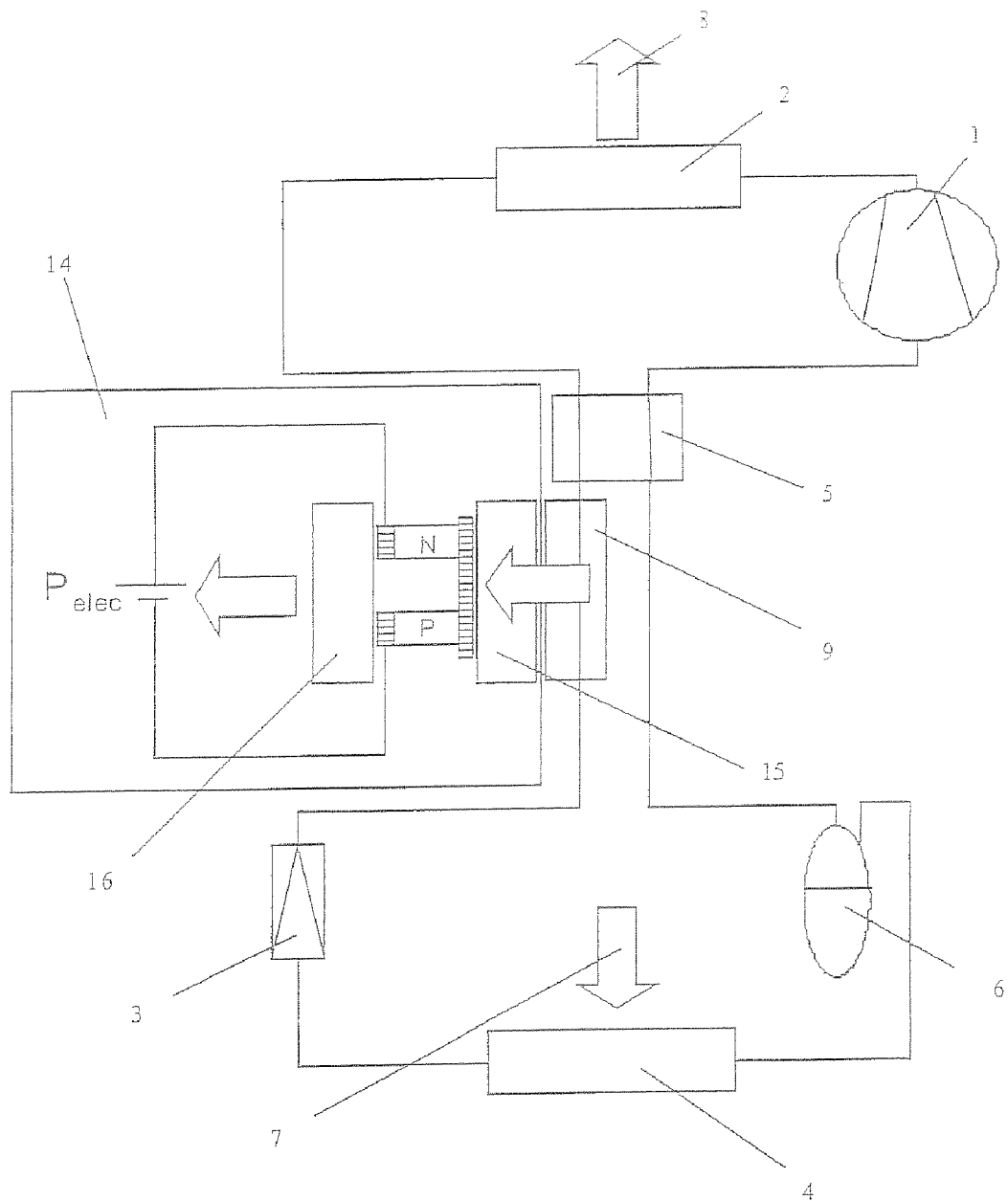
FIG. 7 is a schematic illustration of compression refrigeration circuit of an air conditioning unit for motor vehicles according to the invention including an additional heat exchanger alternatively positioned, in contact with a thermoelectric cooling element.

FIG. 7 shows a compression refrigeration circuit of an air conditioning unit according to the invention for motor vehicles provided with an alternatively positioned additional heat exchanger 9 that is in contact to a thermoelectric element 14. In comparison with the embodiment of FIG. 4 the order of internal heat exchanger 5 and additional heat exchanger 9 in direction of flow is exchanged. Otherwise, the description of FIG. 5 applies.

Figure 8:
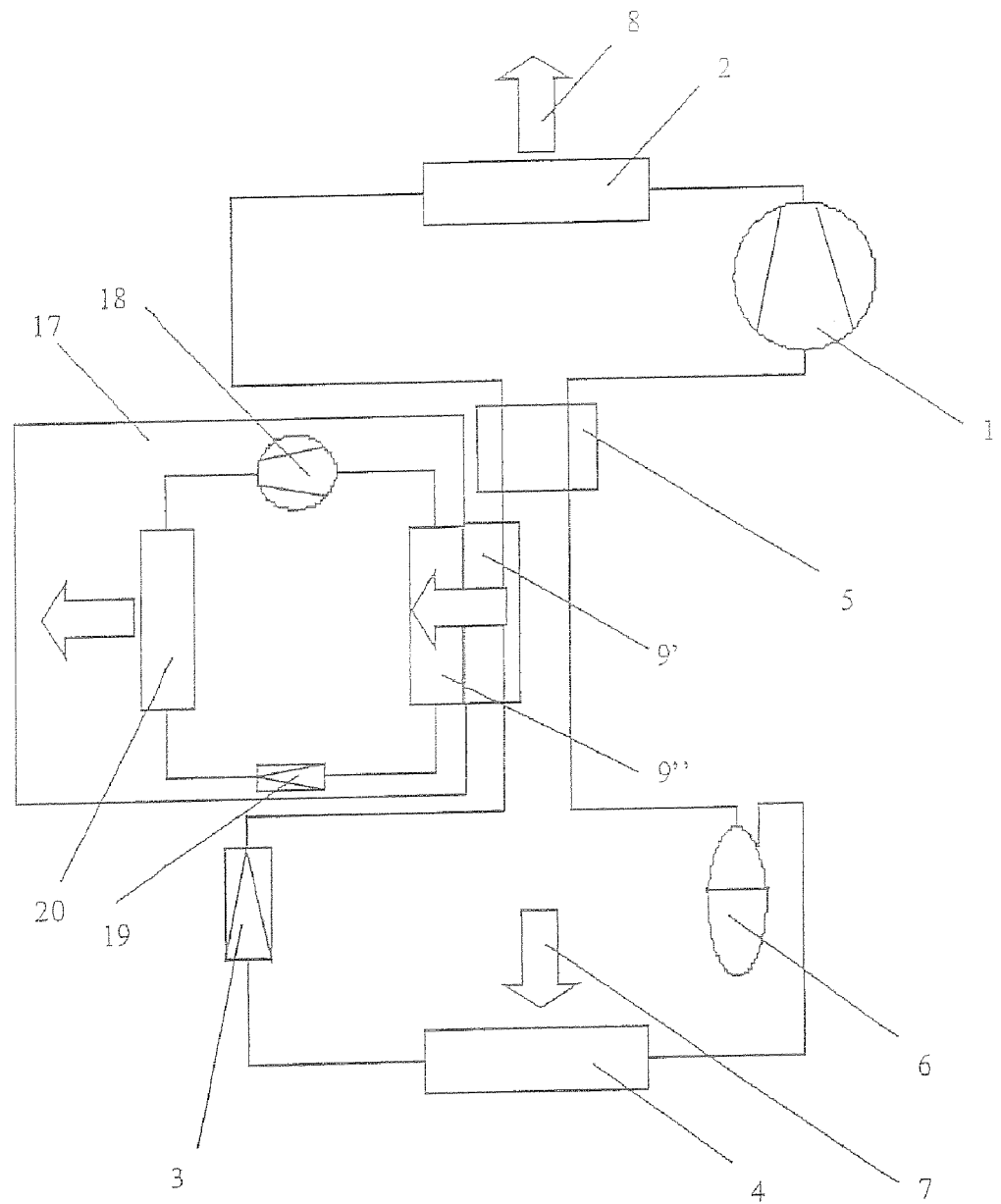
FIG. 8 is a compression refrigeration circuit of an air conditioning unit for motor vehicles according to the invention including an additional heat exchanger alternatively positioned coupled to another compression circuit.

FIG. 8 shows a compression refrigeration circuit of an air conditioning unit according to the invention for motor vehicles provided with an alternatively positioned additional heat exchanger 9', 9'', coupled to a further compression refrigeration circuit 17. In comparison with the embodiment of FIG. 5 the order of internal heat exchanger 5 and additional heat exchanger 9', 9'' in direction of flow is exchanged. Otherwise, the description of FIG. 5 applies.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An air conditioning refrigerant circuit for a motor vehicle comprising:
   at least one compressor;
   a heat-delivering heat exchanger downstream of the compressor;
   an expansion element;
   a heat-absorbing heat exchanger downstream of the expansion element, wherein the the compressor, the heat-delivering heat exchanger, the expansion element, and the heat-absorbing heat exchanger are in series in respect of a flow path of a refrigerant;
   an additional heat exchanger disposed between the heat-delivering heat exchanger and the expansion element, the heat exchanger thermally coupled to at least one switchable cooling means, wherein a temperature of the cooling means facilitates reaching a temperature below a temperature of the refrigerant flowing from the heat-delivering heat exchanger; and
   an internal heat exchanger integrated into the flow path between the heat-absorbing heat exchanger and the compressor and into the flow path between the heat-delivering heat exchanger and the expansion element.

2. The air conditioning refrigerant circuit according to claim 1, wherein the additional heat exchanger is switched in series with the internal heat exchanger.

3. The air conditioning refrigerant circuit according to claim 1, wherein the additional heat exchanger is integrated into the flow path of the refrigerant between the heat-delivering heat exchanger and the internal heat exchanger.

4. The air conditioning refrigerant circuit according to claim 1, wherein the additional heat exchanger is integrated into the flow path of the refrigerant between the internal heat exchanger and the expansion element.

5. The air conditioning refrigerant circuit according to claim 1, wherein the refrigerant is carbon dioxide.

6. The air conditioning refrigerant circuit according to claim 1, wherein the temperature of the cooling means can be adjusted dependent on the temperature of the refrigerant in the refrigeration circuit.

7. The air conditioning refrigerant circuit according to claim 1, wherein the cooling means includes a secondary cooling circuit having a circulating fluid and a heat-delivering heat exchanger.

8. The air conditioning refrigerant circuit according to claim 1, wherein the cooling means includes at least one thermoelectric element.

9. The air conditioning refrigerant circuit according to claim 1, wherein the cooling means is a secondary refrigeration circuit having a cold portion coupled to the additional heat exchanger.

10. The air conditioning refrigerant circuit according to claim 1, wherein the cooling means is a secondary cooling circuit having a cold portion coupled to the additional heat exchanger, the secondary cooling circuit thermally coupled to a cold store, the cold store having a charging heat exchanger integrated into the refrigerant circuit downstream of the heat-absorbing heat exchanger, the charging heat exchanger adapted to charge the cold store.

11. A method of operation of an air conditioning refrigerant circuit for a motor vehicle comprising the steps of:
   providing an air conditioning refrigerant circuit for motor vehicles including at least one compressor; a heat-delivering heat exchanger downstream of the compressor; an internal heat exchanger downstream of the heat-delivering heat exchanger; an expansion element; a heat-absorbing heat exchanger downstream of the expansion element, wherein the compressor, the heat-delivering heat exchanger, the internal heat exchanger, the expansion element, and the heat-absorbing heat exchanger are in series in respect of a flow path of a refrigerant; and an additional heat exchanger disposed between the heat-delivering heat exchanger and the expansion element, the additional heat exchanger thermally coupled to at least one switchable cooling means, wherein a temperature of the cooling means facilitates reaching a temperature below a temperature of the refrigerant flowing from the heat-delivering heat exchanger;
   providing a temperature of the refrigerant flowing from the heat-delivering heat exchanger; and
   adjusting the temperature of the cooling means based on the provided temperature of the refrigerant flowing from the heat-delivering heat exchanger.

12. The method according to claim 11, including the step of detecting the temperature of the refrigerant flowing from the heat-delivering heat exchanger by directly measuring the temperature of the refrigerant flowing from the heat-delivering heat exchanger.

13. The method according to claim 11, including the step of detecting the temperature of the refrigerant flowing from the heat-delivering heat by measuring a surface temperature of a fluid line containing the refrigerant flowing from the heat-delivering heat exchanger.

14. The method according to claim 11, including the step of causing the temperature of the refrigerant flowing from the heat-delivering heat exchanger to be reduced when the provided temperature exceeds a threshold value.

15. The air conditioning refrigerant circuit according to claim 14, including the step of providing a secondary cooling circuit having a cold portion forming the at least one cooling means coupled to the additional heat exchanger of the refrigerant circuit.

16. The air conditioning refrigerant circuit according to claim 15, including the step of providing a cold store thermally coupled to the secondary cooling circuit and having a charging heat exchanger integrated into the air conditioning circuit downstream of the heat-absorbing heat exchanger, the charging heat exchanger adapted to charge the cold store.

17. The air conditioning refrigerant circuit according to claim 16, including the step of charging the cold store when the provided temperature is below the threshold value.

18. The air conditioning refrigerant circuit according to claim 17, including the step of providing cooling to the secondary cooling circuit from the cold store when the provided temperature exceeds the threshold value.

* * * * *